Sept. 12, 1972      R. S. DAHL      3,690,902

CAKE PACKAGE

Filed March 18, 1970      2 Sheets-Sheet 1

INVENTOR.
ROBERT S. DAHL
BY Frederick E. Lange
ATTORNEY

Sept. 12, 1972  R. S. DAHL  3,690,902
CAKE PACKAGE

Filed March 18, 1970  2 Sheets-Sheet 2

INVENTOR.
ROBERT S. DAHL
BY Frederick E. Lange
ATTORNEY

United States Patent Office 3,690,902
Patented Sept. 12, 1972

3,690,902
CAKE PACKAGE
Robert S. Dahl, 5820 82nd Terrace,
Pinellas Park, Fla. 33565
Filed Mar. 18, 1970, Ser. No. 20,580
Int. Cl. B65b 25/16
U.S. Cl. 99—172                              7 Claims

ABSTRACT OF THE DISCLOSURE

A cake cover designed to be detachably secured to a corrugated cake base for packaging a cake therein, the cake cover including a side wall consisting essentially of a plurality of vertically extending small ribs and a plurality of vertically extending large ribs interspersed among said small ribs, both sets of ribs being spaced outwardly from an inner peripheral boundary defined by the intersection of adjacent ribs; and a relatively rigid dome portion designed to enclose a cake mounted on the corrugated cake base, and to be spaced therefrom when the cover is secured to the base.

BACKGROUND OF THE INVENTION

The present invention relates generally to food packages, and more specifically to a cake cover for use by a baker when displaying and selling cakes.

One of the problems of the past with respect to this art involves the time consuming process of packaging a cake for sale to the customer, and the inefficient, and often unsanitary, method of displaying a cake prior to the sale. Also, the disadvantage of prior cake packaging does not end when the cake is packaged and carried from the bakery shop by the customer. Instead, the problems are passed on to the customer when she attempts to remove the cake from the package.

A principal method of the past for packaging a decorated cake involves the use of a fold-down chipboard box, with or without a window. A baker utilizing the box packaging method generally has two alternate choices when he finishes baking and decorating a cake, (1) he can immediately package the cake in a box, or (2) he can set the cake out for display and package it when it is sold. Regardless of which alternative he chooses, he must, at some time, package the cake.

First of all, the packaging operation takes a considerable amount of time. The baker or his assistant must first open up the flat, fold-down box, put it together while leaving one end open, slide in the cake, close the open end, and tape the box shut. The cake is then ready for the customer to take home, but it is not ready for display. If the baker decides to follow the first alternative and package the cake immediately after decorating, he must hire someone else to perform, or he himself must perform, the time consuming operation of packaging the cakes. Then, when the sale is made, the cake is ready for the customer to take home. However, it is quite unusual for a customer to purchase a cake without first inspecting it. As a result, this alternative is undesirable.

If the baker decides to follow the second alternative so that the cake may be displayed to the customer before purchase, he or his sales girl must package the cake at the time of sale. This packaging usually takes several minutes and often results in the causation of several unhappy customers who are waiting in line for service. In addition, the open display of the cakes is quite unsanitary, and reduces the shelf life of the cake.

Even when the packaged cake has been sold and passed onto the customer, the problems involving the box packaged cake do not cease. The first problem facing the customer of a box packaged cake is removing the cake from the box. Often the customer will cut the box apart in an attempt to remove it. This, however, more often than not, results in a damaged cake. If he does manage to successfully remove the cover from the cake box, a further problem arises when the consumer reaches into the box to lift the cake out. This is a very delicate situation and, for the average customer, usually requires practice with several cakes before sufficient skill is achieved to remove the cake without touching the frosting.

After the cake has been removed from the box and partially consumed, the box cannot be used as a place in which to store the unused portion of the cake for any period of time, since the cake would quickly dry out. Even if the box could be kept intact and even if it could reasonably preserve the cake, use of the box for cake storage would certainly be less than convenient.

SUMMARY OF THE INVENTION

The present invention is designed to solve many of the problems now present in the packaging of decorated cakes. With the present invention, a baker can package the cakes as soon as he finishes decorating them, and in a fraction of the time it takes to package the same cake in a box. This alone saves him and his employees a substantial amount of time. In addition, even after packaging, the cake is totally visible to the customer so that she can pick out the cake of her choice. The present invention also provides the most sanitary way possible to handle the cakes, increases the shelf life of the cake by several days, and insures the freshness of the cake to the consumer.

The advantages of the present invention continue even after the cake has been passed on to the customer. In comparison to the cake box of the past, the package means of the present invention is very simple to remove without the slightest chance of damaging the cake. It also serves as an efficient and convenient way to store unused cake once it has been removed from the package. In addition, means are provided for efficiently storing the packaging components of the present invention prior to the use of the components for packaging.

Accordingly, it is an object of the present invention to provide an improved cake cover or package to substantially reduce the time necessary for packaging a cake.

It is also an object of the present invention to provide an improved cake package wherein the cake may be packaged immediately after decorating and still be prominently displayed prior to sale.

Another object of the present invention is to provide an improved cake package wherein a novel rib arrangement is utilized to give the cover portion maximum stability, as well as to provide maximum visibility and minimum distortion of the cake.

Another object of the present invention is to provide an improved cake package wherein the cake is easily removed from the package and where the package may be reused as a means for storing any unused portion of the cake.

A further object of the present invention is to provide an improved cake package wherein the individual components of the package, before they are assembled, may be efficiently stacked and easily removed from their stacked position.

These and other objects and advantages of the present invention will become apparent upon reference to the following drawings, specification and appended claims.

DESCRIPTION OF THE PREFERRED EMBODIMENT

Figure 1:
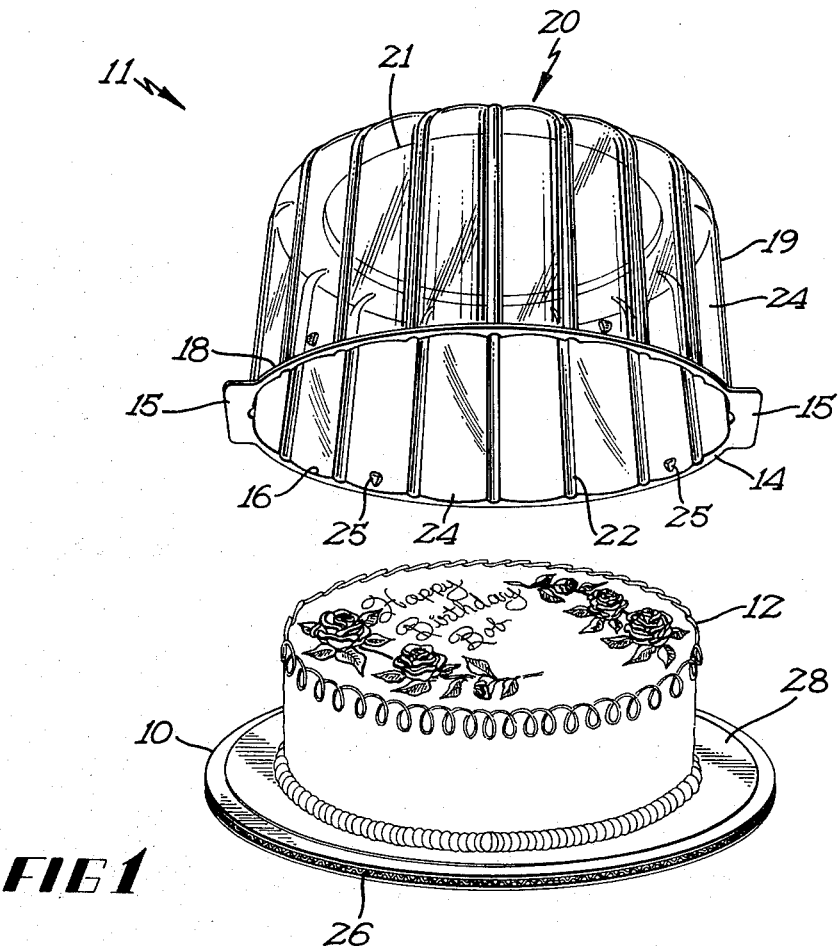
FIG. 1 is a perspective, expanded view of the cake package with a cake mounted on the base and the cake cover in position for placement over the cake.

Referring first to FIG. 1, the cake package can be seen as comprising a base 10, and a hollow cake cover 11 which is designed to be detachably secured to the base 10 for packaging and displaying a cake 12 mounted to the base. The base 10 is an ordinary piece of stiff corrugated cardboard with suitable rigidity for mounting the cake 12. Although the size of the base shown in the drawings is substantially larger than the bottom of the cover 11, the size of the base 10 is not of particular importance. It must, however, be greater than the size of the cake bottom and must be large enough to allow the cover 11 to be secured to it. The cake 12 may be mounted directly on the cardboard base 10 or it may be mounted on the base as shown in FIGS. 1–4, with a piece of waxed paper 28 positioned therebetween. The paper 28 may be glued to the base 10 to define the upper surface of the base and to prevent movement of the paper with respect to the base. A layer of frosting is then spread onto the paper 28 and the cake is placed thereon. Because of the weight of the cake 12, the paper 28 and the frosting is pressed into the corrugations 26 so that when the frosting dries, the cake is secured to the base 10, thereby preventing any lateral movement of the cake 12 with respect to the base 10.

Figure 2:
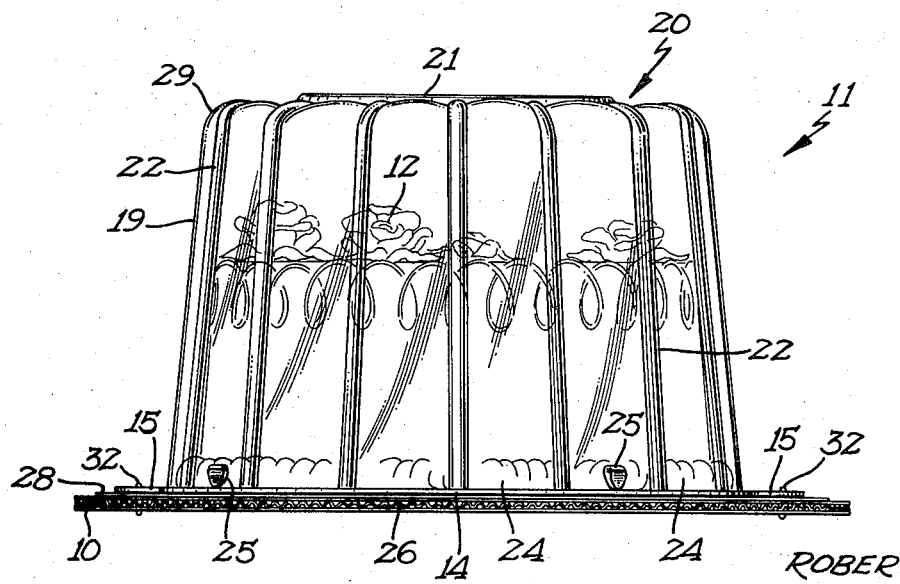
FIG. 2 is a side view of the cake package, with the tabs of the cake cover stapled to the base portion, enclosing the cake therein.
Figure 3:
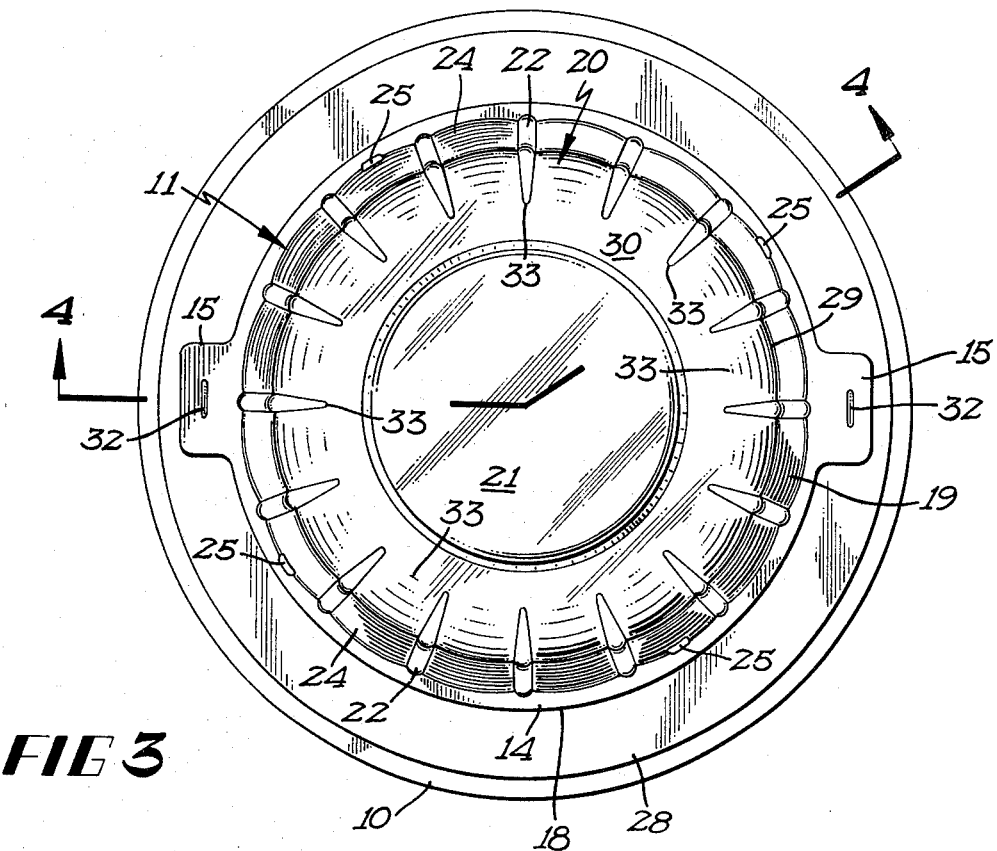
FIG. 3 is a plan view of the cake package with the cover attached to the base by staples, without showing the cake therein.
Figure 4:
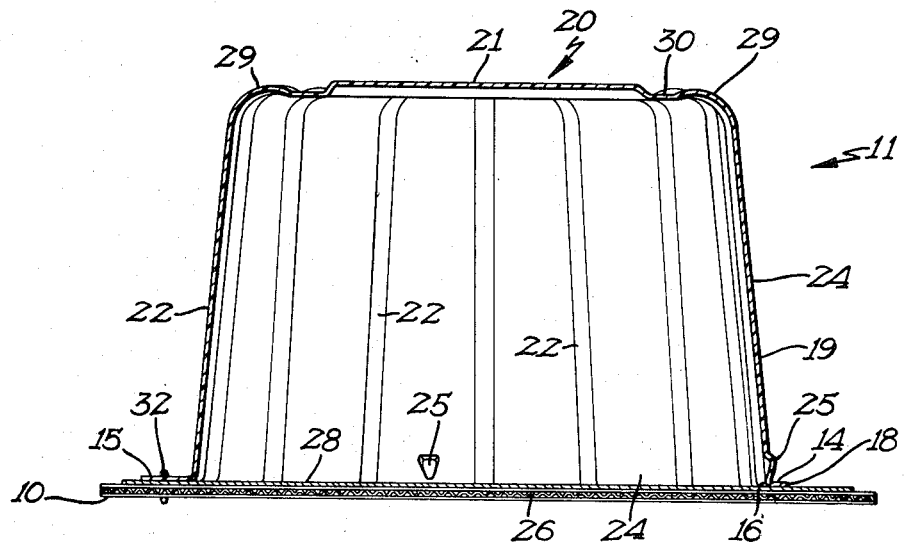
FIG. 4 is a sectional view of the cake package as taken along lines 4—4 of FIG. 3.

The cover 11 includes a bottom flange 14, a side wall 19 and a top portion 20 which is normally constructed from a relatively thin, flexible and transparent material. The flange 14 defines the lower edge of the cover 11 and extends outwardly from the side wall 19. When the cover 11 is placed over the cake as shown in FIGS. 2, 3 and 4, the flange 14 is disposed against the upper surface of the base to provide an efficient sealing arrangement between the cover 11 and the base 10. As a result, it is desirable for the flange 14 to be of sufficient width to serve as an effective seal. The flange 14 also provides for additional stability of the side wall 19 to prevent the side wall from contacting the cake 12 when the cover 11 is in the position shown in FIGS. 2, 3 and 4. A pair of integral tabs 15 extend outwardly from the outer circumferential edge 18 of the flange 14 to provide means for detachably securing the cover 11 to the base 10. In the present embodiment, the cover 11 is secured to the base 10 by stapling the two tabs 15 to the base with a conventional stapler (not shown) and staples 32 (FIGS. 2, 3 and 4).

The side wall 19 is integrally formed with the inner edge 16 of the flange 14 and extends upwardly therefrom. As can best be seen in FIGS. 1 and 2, the side wall must extend upwardly for a distance substantially greater than the height of the cake 12 which is mounted on the base 10. Thus, when the cover 11 is secured to the base 10 as shown in FIGS. 2, 3 and 4, the top 20 of the cover is spaced from the top portion of the cake.

The side wall 19 includes alternate small and large vertically extending ribs or columns 22 and 24, respectively. The relationship between the small and large ribs 22 and 24, respectively, can be seen with reference to FIGS. 1–4. The large ribs 24, as shown, have a substantially greater radius of curvature than the small ribs 22 and comprise a substantially greater portion of the side wall 19 than the small ribs 22. The primary purpose of the large ribs 24 is to reduce the distortion caused by looking at the cake through the cover 11, and thus aid the purchaser in viewing the cake 12 before purchasing it. The small ribs 22 have a relatively small radius of curvature and comprise a much smaller portion of the side wall 19 than the large ribs 24. The small ribs 22 add greater stability to the side wall 19, and increase the effective internal diameter of the cover 11. It will be obvious that if only the large ribs were employed, the diametrical spacing between the lines of intersection of the ribs along any horizontal plane would be less than the internal diameter of the present cover along the same plane.

As is evident from the illustrations, the points of intersection of adjacent ribs define an inner peripheral boundary having a shape conforming substantially to the shape of the cake to be packaged therein. For example, in the instant case, the inner peripheral boundary would be a circle passing through the points of intersection of adjacent ribs. As is further evident from the illustrations, the large ribs 24, in addition to having a substantially greater radius of curvature than the small ribs 22, have a radius of curvature sufficiently small that the portion of each of the large ribs 24 between its points of intersection with adjacent ribs is spaced outwardly from the inner peripheral boundary.

The top portion 20 of the cover 11 is integrally formed with the side walls 19. As shown best in FIGS. 3 and 4, the ribs 22 and 24 extend from the side wall 19 and onto the top 20 to actually define a portion of the top. In this manner, the ribs 22 and 24 define a rounded edge 29 of the dome. After extending onto the top portion 20, the ribs 22 and 24 curve downwardly for a distance before terminating at 33. As a result of the ribs 22 and 24 extending over the rounded edge, the cover 11 is given additional stability and resiliency. Thus, if the cover 11 is inadvertently bumped or partialy crushed, it will have a tendency to bounce back and assume its normal shape and form.

A circular convex center 21 or raised portion of the top 20 serves a similar purpose as the rounded edge 29 in that it gives the cover 11 and the top portion 20 stability and rigidity, as well as resiliency, so that the top 20 has a tendency to assume its normal shape if it should inadvertently be depressed. The convex center 21 comprises a substantial portion of the top 20, with its edges being spaced from the termination 33 of the ribs 24 and 22 by the flat portion of the top 30.

As shown in the FIGS. 1 through 4, the side wall 19 slopes inwardly as it extends from the inner edge of the flange 16 to the top 20. In the present embodiment, the angle of the slope is about five degrees. This sloping side allows a number of covers 11 to be efficiently stacked, one inside the other, prior to their use with the base 10. Also, to prevent adjacently stacked covers 11 from being stacked too tightly, four anti-stack tabs 25 are equally spaced about the perimeter of the side wall 19, near the bottom flange 14, to allow a single cover 11 to be easily removed from a stack of covers. Without the tabs 25, a number of covers 11 could become stacked so tightly that removal of one of the covers would be very difficult. Each anti-stack tab 25 includes an externally protruding portion of the side wall (best seen in FIG. 4) so that when a plurality of covers are stacked together, adjacent covers can be stacked only as close as the tabs 25 permit.

A summary of the baker's use of the previously described cake cover may be seen with general reference to FIG. 1. Before use, a baker has a number of covers 11 and bases 10 separately stacked within easy reach. After the cake has been baked and cooled, he spreads some frosting onto the base 10 and places the cake on the base so that it is reasonably centered. He then proceeds to decorate the cake. When this is completed, he removes one of the covers from the stack, places it over the cake, and staples the tabs 15 to the base 10 (FIGS. 2, 3 and 4). As mentioned previously, the base 10 must be large enough so that the cover 11 may be secured thereto.

When the cover 11 has been stapled to the base 10 (FIGS. 2, 3 and 4), the cake is ready to be placed on the shelf for display and for sale. When the purchaser has the cake at home and wishes to remove the cover, all she has to do is take an ordinary butter knife or similar object and insert it between the upper portion of the staple 32 and the tab 15, or between the tab 15 and the base 10, and pry up gently. This will cause the staple 32 to pop out. The cover 11 may then be lifted from the base 10 without damage to the cake. The cover 11 may also be reused to cover any unused portion of the cake. The cover may be restapled to the base with a conventional stapler, or it may simply be allowed to rest on the base 10. Either way will keep the unused portion of the cake fresh.

This invention may be embodied in other forms not specifically shown in the preferred embodiment without departing from the spirit or essential characteristics thereof. For example, the shape of the cover may be other than circular, or the bottom flange 14 may be widened and the tabs 15 eliminated so that the flange 14 may be directly stapled to the base 10. The preferred embodiment, while having definite advantages, is therefore to be considered illustrative only, with the scope of the invention being indicated by the appended claims and their equivalents.

What is claimed and desired to be secured by United States Letters Patent is:

1. A cake cover used for displaying and packaging cakes wherein the cover is designed to enclose and protect a cake which is disposed on a conventional cake base of suitable rigidity for mounting and supporting a cake, the size of the said base being substantially larger than the bottom of the cake to be mounted thereon so that a portion of the base extends outwardly from said cake along the entire circumference of the cake, said cake cover being formed of relatively flexible, transparent material and comprising:
   a bottom sealing and stabilizing flange extending around the lower edge of said cover, said flange having portions designed to be detachably secured to such a cake base when a cake is disposed thereon;
   a side wall integrally formed with and extending upwardly from the inner edge of said bottom flange to a height greater than the height of said cake to be packaged therein, said side wall consisting essentially of a plurality of vertically extending small ribs and a plurality of vertically extending large ribs interspersed among said small ribs, said small and large ribs having outwardly curved walls and being circumferentially spaced such that the intersections of the curved walls of adjacent ribs define an inner peripheral boundary conforming substantially to the shape of the cake to be packaged therein, said large ribs having a radius of curvature substantially greater than that of said small ribs but sufficiently small so that the portion of each of said large ribs between the points of intersection with adjacent ribs is spaced outwardly from said inner peripheral boundary, the portion of each of said small ribs between the points of intersection with adjacent ribs, also being spaced outwardly from said inner peripheral boundary adding stability to the side wall;
   a top cover portion integrally formed with said side wall, said large and small ribs extending from said side wall onto said top portion for a limited distance and defining a rounded edge around said top portion providing additional stability and resiliency to aid said cover in retaining its original shape and form, and said top portion also having a raised center portion providing additional stability, rigidity and resiliency to said cover.

2. The cake cover of claim 1 wherein said large ribs comprise at least three times as much of said side wall as said small ribs.

3. The cake cover of claim 1 in which the portions of said small and large ribs which extend over the top edge curve downwardly from said rounded edge, and said cover includes a flat portion between the ends of said ribs and the raised center portion.

4. The cake cover of claim 1 wherein said inner peripheral boundary is a circle.

5. The cake cover of claim 4 wherein said small and large ribs are alternately arranged about the periphery of said cover.

6. A cover and base for use in making a cake package for displaying and protecting cakes, said cake package comprising:
   a cake base of corrugated card board having suitable rigidity for mounting and supporting a cake, the size of said base being substantially larger than the bottom of the cake to be mounted thereon so that a portion of the base extends outwardly from said cake along the entire circumference of the cake;
   a relatively thin, flexible and transparent cake cover according to claim 1 adapted to be placed over the cake which is to be mounted to said base; and
   means for detachably securing said cover to said base.

7. The cake package of claim 6 wherein the means deachably securing the cover to said base includes a staple securing each of said portions of said flange to said base.

References Cited

UNITED STATES PATENTS

| | | | |
|---|---|---|---|
| 2,925,173 | 2/1960 | Marcucci | 99—172 X |
| 3,515,304 | 6/1970 | Bliss | 312—285 X |
| 3,077,284 | 2/1963 | McLaughlin | 150—.5 X |
| 3,066,824 | 12/1962 | Bostrom | 150—.5 X |
| 2,914,104 | 11/1959 | Jocelyn | 150—.5 |
| 2,741,414 | 4/1956 | Nottage | 99—172 UX |
| 2,326,014 | 8/1943 | Damrow | 206—45.32 |
| 2,126,185 | 8/1938 | Friedl | 206—45.32 |
| 3,031,309 | 4/1962 | Bogner et al. | 99—172 X |
| 2,246,695 | 6/1941 | Phillips | 206—45.32 UX |
| 2,200,867 | 5/1940 | Weltmer | 206—45.32 UX |
| 2,937,949 | 5/1960 | Loevenbruck | 206—46F X |
| 3,261,530 | 7/1966 | Cave | 99—171R UX |

FRANK W. LUTTER, Primary Examiner

S. L. WEINSTEIN, Assistant Examiner

U.S. Cl. X.R.

99—171C; 150—.5; 206—Dig. 2, 45.32; 312—284